UNITED STATES PATENT OFFICE.

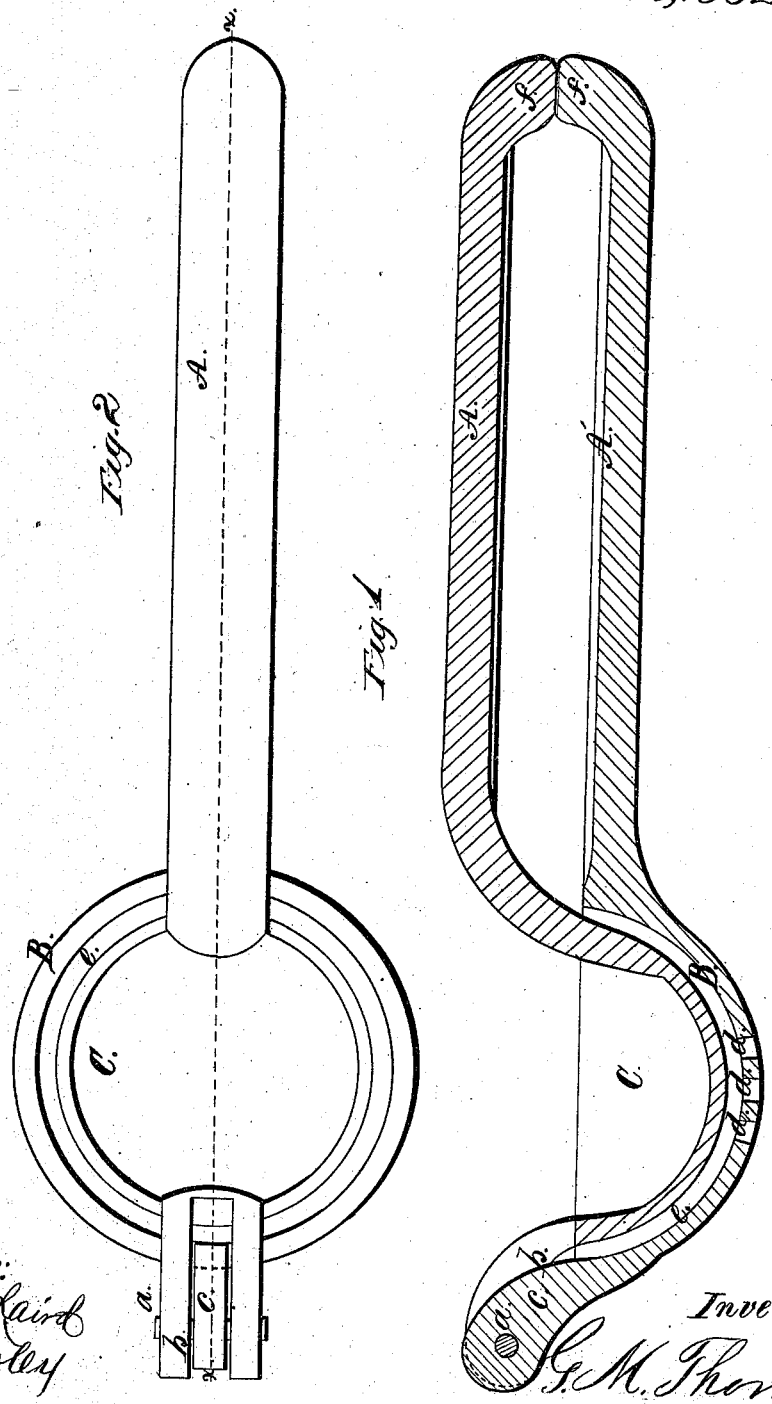

GEORGE M. THOMAS, OF NEW YORK, N. Y.

IMPROVED LEMON-SQUEEZER.

Specification forming part of Letters Patent No. 35,554, dated June 10, 1862.

*To all whom it may concern:*

Be it known that I, GEORGE M. THOMAS, of the city, county, and State of New York, have invented a new and Improved Lemon-Squeezer; and I do hereby declare that the following is a full, clear, and exact description of the same, reference being had to the accompanying drawings, making a part of this specification, in which—

Figure 1 is a side sectional view of my invention, taken on the line $x$, Fig. 2. Fig. 2 is a plan or top view of the same.

Similar letters of reference indicate corresponding parts in the two figures.

This invention consists in constructing the squeezer of cast metal and of such form or in such a manner that a very durable, economical, and light implement for the purpose is obtained, and one that may be manipulated or operated with greater facility than the ordinary kinds in general use.

To enable those skilled in the art to fully understand and construct my invention, I will proceed to describe it.

A A' represent the two handles of the implement, the front ends of which are connected by a fulcrum-pin, $a$. The upper handle, A, is provided with a longitudinal slot, $b$, at its front, and in which the front end, $c$, of handle A' is fitted loosely, the pin $a$ passing through $b$ and $c$, as shown clearly in Fig. 2.

The lower handle, A', near its front end, is provided with a bowl, B, of semispherical form, and perforated at its bottom, as shown at $d$ in Fig. 1. The inner surface of the bowl B is enameled, or should be, in order to prevent oxidation. The bowl B and handle A' are cast in one piece, and the bowl projects below the handle, the latter being on a level or in the same plane with the upper edge of the former. The front end of the handle A', however, through which the fulcrum-pin $a$ passes, projects above the bowl, as shown clearly in Fig. 1.

The handle A, near its front end, is also provided with a bowl, C, cast with it of semispherical form, but smaller than the bowl B, so that the former may fit within the latter and allow a space, $e$, of suitable width between them when the handles are fully closed. (See Fig. 1.) The free or discharged ends of the handles A A' are curved, as shown at $f$, in order to form proper stops or bearings.

The lemon is squeezed by being divided, as usual, and one-half at a time placed in the bowl B, and forcing the bowl C down upon it by pressing the handles A A' together. In consequence of having the bowl B project down below the handle A', it may be fitted in the top of a glass or bowl which is designed to receive the juice, so that none of the latter can escape.

Cast-iron would probably be the most preferable material for the squeezer, and it may be japanned, so as to have a neat appearance and prevent oxidation. The device thus constructed will be light and may be manufactured at a reasonable cost. It is far preferable to the wooden ones now in use, as the latter soon become saturated with stale lemon-juice, and have an unpleasant odor, and they cannot, like my invention, be fitted in a tumbler or vessel to prevent the waste of juice as the lemon is compressed.

I do not claim, broadly, a cast-metal lemon-squeezer irrespective of the construction or form of the same, for such device has been previously used; but What I do claim as new, and desire to secure by Letters Patent, is—

A cast-metal lemon-squeezer composed of two handles, A A', connected at their front ends by a fulcrum-pin, $a$, and provided, respectively, with bowls B C, one fitting within the other and below the handles, substantially as described.

GEORGE M. THOMAS.

Witnesses:
JAMES LAIRD,
RICHARDSON GAWLEY.